US011173687B2

(12) United States Patent
Kuroda

(10) Patent No.: US 11,173,687 B2
(45) Date of Patent: Nov. 16, 2021

(54) REINFORCED SUBSTRATE FOR COMPOSITE MATERIAL, COMPOSITE MATERIAL, AND METHOD FOR MANUFACTURING REINFORCED SUBSTRATE FOR COMPOSITE MATERIAL

(71) Applicant: Nissan Motor Co., Ltd., Yokohama (JP)

(72) Inventor: Shinichi Kuroda, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 16/341,944

(22) PCT Filed: Nov. 1, 2016

(86) PCT No.: PCT/JP2016/082454
§ 371 (c)(1),
(2) Date: Apr. 15, 2019

(87) PCT Pub. No.: WO2018/083734
PCT Pub. Date: May 11, 2018

(65) Prior Publication Data
US 2019/0240953 A1    Aug. 8, 2019

(51) Int. Cl.
*B32B 5/12* (2006.01)
*D01F 11/00* (2006.01)
(Continued)

(52) U.S. Cl.
CPC .............. *B32B 5/12* (2013.01); *B29C 70/202* (2013.01); *B29C 70/226* (2013.01); *B32B 5/06* (2013.01);
(Continued)

(58) Field of Classification Search
CPC .. B32B 5/12; B32B 5/06; B29C 70/20; B29C 70/202; D04H 3/04
See application file for complete search history.

(56) References Cited

U.S. PATENT DOCUMENTS

2005/0059309 A1\* 3/2005 Tsotsis ................. D04H 13/006
442/381
2005/0070182 A1    3/2005 Dunn
(Continued)

FOREIGN PATENT DOCUMENTS

CN           1452672 A      10/2003
CN         105073364 A      11/2015
(Continued)

OTHER PUBLICATIONS

Czél, Gergely, and M. R. Wisnom. "Demonstration of pseudo-ductility in high performance glass/epoxy composites by hybridisation with thin-ply carbon prepreg." Composites Part A: Applied Science and Manufacturing 52 (2013): 23-30. (Year: 2013).\*
(Continued)

*Primary Examiner* — Michael Zhang
(74) *Attorney, Agent, or Firm* — Global IP Counselors, LLP

(57) ABSTRACT

A reinforced substrate is provided for use in molding a composite material. The reinforced substrate has a reinforcing layer having reinforcing fibers extending in a fiber direction that is aligned in a single direction and auxiliary fibers laminated on only one surface of the reinforcing layer so as to extend in only one direction that intersects with the fiber direction. The auxiliary fibers are joined to the reinforcing fibers to hold the reinforcing layer. The auxiliary fibers have a higher tensile elongation at break than do the reinforcing fibers. The reinforcing layer is arranged with fiber bundles of large tows being aligned in an unopened (Continued)

state. The large tows have a higher fiber count of the reinforcing fibers than does a regular tow.

10 Claims, 15 Drawing Sheets

(51) Int. Cl.
| | | |
|---|---|---|
| *B65H 59/00* | (2006.01) | |
| *D04H 3/115* | (2012.01) | |
| *D04H 3/045* | (2012.01) | |
| *B29C 70/22* | (2006.01) | |
| *D04H 3/04* | (2012.01) | |
| *B32B 5/06* | (2006.01) | |
| *B29C 70/20* | (2006.01) | |

(52) U.S. Cl.
CPC ............ *B65H 59/00* (2013.01); *D01F 11/00* (2013.01); *D04H 3/04* (2013.01); *D04H 3/045* (2013.01); *D04H 3/115* (2013.01); *B32B 2255/02* (2013.01)

(56) References Cited

U.S. PATENT DOCUMENTS

| | | | |
|---|---|---|---|
| 2009/0155522 A1* | 6/2009 | Raghavendran | .......... B32B 5/12 428/113 |
| 2012/0107596 A1 | 5/2012 | Kuntz | |
| 2015/0125651 A1* | 5/2015 | Tsuchiya | .............. D04B 21/165 428/102 |
| 2015/0258712 A1* | 9/2015 | Moser | .................... D04H 3/115 428/113 |
| 2015/0375461 A1 | 12/2015 | Blackburn et al. | |
| 2017/0191194 A1* | 7/2017 | Jackson | .................. D01F 9/225 |
| 2018/0093397 A1* | 4/2018 | Tsuji | ..................... B29B 15/105 |

FOREIGN PATENT DOCUMENTS

| | | |
|---|---|---|
| JP | 2001-55642 A | 2/2001 |
| JP | 2008-132775 A | 6/2008 |
| JP | 2010-17934 A | 1/2010 |
| JP | 2010-156081 A | 7/2010 |
| JP | 5261171 B2 | 8/2013 |
| JP | 2015-145547 A | 8/2015 |
| JP | 2016-121424 A | 7/2016 |
| WO | 2012/076308 A1 | 6/2012 |
| WO | 2016/147646 A1 | 9/2016 |

OTHER PUBLICATIONS

Saertex, "Multiaxial interlaid complexes made by SAERTEX—from glass, carbon an aramid," Mar. 26, 2016, Retrieved on Dec. 7, 2020 from https://web.archive.org/web/20160326155905/https://www.saertex.com/en/products/multiaxial-fabrics (Year: 2016).*

* cited by examiner

REINFORCED SUBSTRATE FOR COMPOSITE MATERIAL, COMPOSITE MATERIAL, AND METHOD FOR MANUFACTURING REINFORCED SUBSTRATE FOR COMPOSITE MATERIAL

CROSS-REFERENCE TO RELATED APPLICATIONS

This application is a U.S. national stage application of International Application No. PCT/JP2016/082454, filed on Nov. 1, 2016.

BACKGROUND

Technical Field

The present invention relates to a reinforced substrate for a composite material, a composite material, and a method for manufacturing a reinforced substrate for a composite material.

Background Information

Composite materials obtained by impregnating a reinforced substrate with a resin in order to reduce a weight of a vehicle body for an automobile have been widely used in recent years as automobile components. An example of a method for manufacturing these composite materials is the method disclosed in Japanese Laid-Open Patent Application No. 2001-55642 (Patent Citation 1) noted below in which a dry substrate not impregnated with resin is used as a reinforced substrate. A dry substrate has lower manufacturing cost than a prepreg in which the reinforced substrate has been impregnated with a resin. Accordingly, a composite material can be manufactured at low cost by the use of a dry substrate as the reinforced substrate.

In the method disclosed in Patent Citation 1, a cloth substrate in which warps and wefts are woven to form a woven fabric is used as a dry substrate. In a cloth substrate, portions (crimps) having curved fibers are formed by the warps and wefts being knitted in intersecting fashion. Curved fibers are known to have lower strength than fibers extended in rectilinear fashion. Accordingly, a cloth substrate will be less strong than a substrate in which the fibers are aligned in a single direction. In order to solve this problem, Japanese Laid-Open Patent Application No. 2015-145547 (Patent Citation 2) and Japanese Laid-Open Patent Application No. 2008-132775 (Patent Citation 3), for example, disclose methods for manufacturing composite materials in which a non-crimp fabric (NCF) substrate is used, the NCF substrate having fibers aligned in a single direction without the formation of crimps.

Since no crimps are formed in an NCF substrate, the strength of the composite material can be increased over that of a cloth substrate. Also, since an NCF substrate does not require a step for weaving warps and wefts, productivity is higher and costs are lower than with a cloth substrate.

SUMMARY

In the NCF substrates disclosed in Patent Citations 2 and 3, a so-called multiaxial substrate is used in which fibers aligned in a single direction are oriented and laminated in two or more directions, and intersecting fibers are stitched and secured to each other. However, in the multiaxial substrate, fibers oriented in a plurality of directions are stitched and secured together, resulting in low elongation and in shaping properties that are inferior to those of a cloth substrate. Therefore, when the substrate is formed, wrinkles are generated in parts of the substrate, depending on the shape of the substrate. When wrinkles are generated, sufficient function cannot be demonstrated in a reinforced substrate for a composite material, creating a problem in that a degree of freedom in shape is limited during shaping.

Inasmuch, the present invention was contrived in order to solve the above-described problems, it being an object thereof to provide a reinforced substrate for a composite material, a composite material, and a method for manufacturing a reinforced substrate for a composite material in which shaping properties can be improved.

A reinforced substrate for a composite material according to the present invention that achieves the aforementioned object is used for molding a composite material. The reinforced substrate has: a reinforcing layer having reinforcing fibers extending in a fiber direction that is aligned in a single direction; and auxiliary fibers laminated on the reinforcing layer so as to extend in only one direction that intersects with the fiber direction, and joined to the reinforcing fibers to hold the reinforcing layer. The auxiliary fibers have a higher tensile elongation at break than do the reinforcing fibers.

In a composite material according to the present invention that achieves the aforementioned object, a resin is disposed in a reinforced substrate. The reinforced substrate in the composite material has: a reinforcing layer having reinforcing fibers extending in a fiber direction that is aligned in a single direction; and auxiliary fibers laminated on the reinforcing layer so as to extend in only one direction that intersects with the fiber direction, and joined to the reinforcing fibers to hold the reinforcing layer. The auxiliary fibers have a higher tensile elongation at break than do the reinforcing fibers.

In a method for manufacturing a reinforced substrate for a composite material according to the present invention that achieves the aforementioned object, reinforcing fibers are arranged so as to form a reinforcing layer in which a fiber direction of the reinforcing fibers is aligned in a single direction. Auxiliary fibers, which have a higher tensile elongation at break than do the reinforcing fibers, are laminated on the reinforcing layer so as to extend in only one direction that intersects with the fiber direction. The auxiliary fibers are joined to the reinforcing fibers to hold the reinforcing layer.

DETAILED DESCRIPTION OF THE EMBODIMENTS

In order to facilitate understanding of the invention, details of an embodiment of the present invention will be described with reference to FIG. 1. The present embodiment is characterized in that a non-crimp fabric (NCF) substrate obtained using large tows is used as a reinforced substrate having a lower manufacturing cost. Hereinbelow, the relationship between the type of reinforced substrate and manufacturing cost will be described with reference to FIG. 1.

Figure 1:
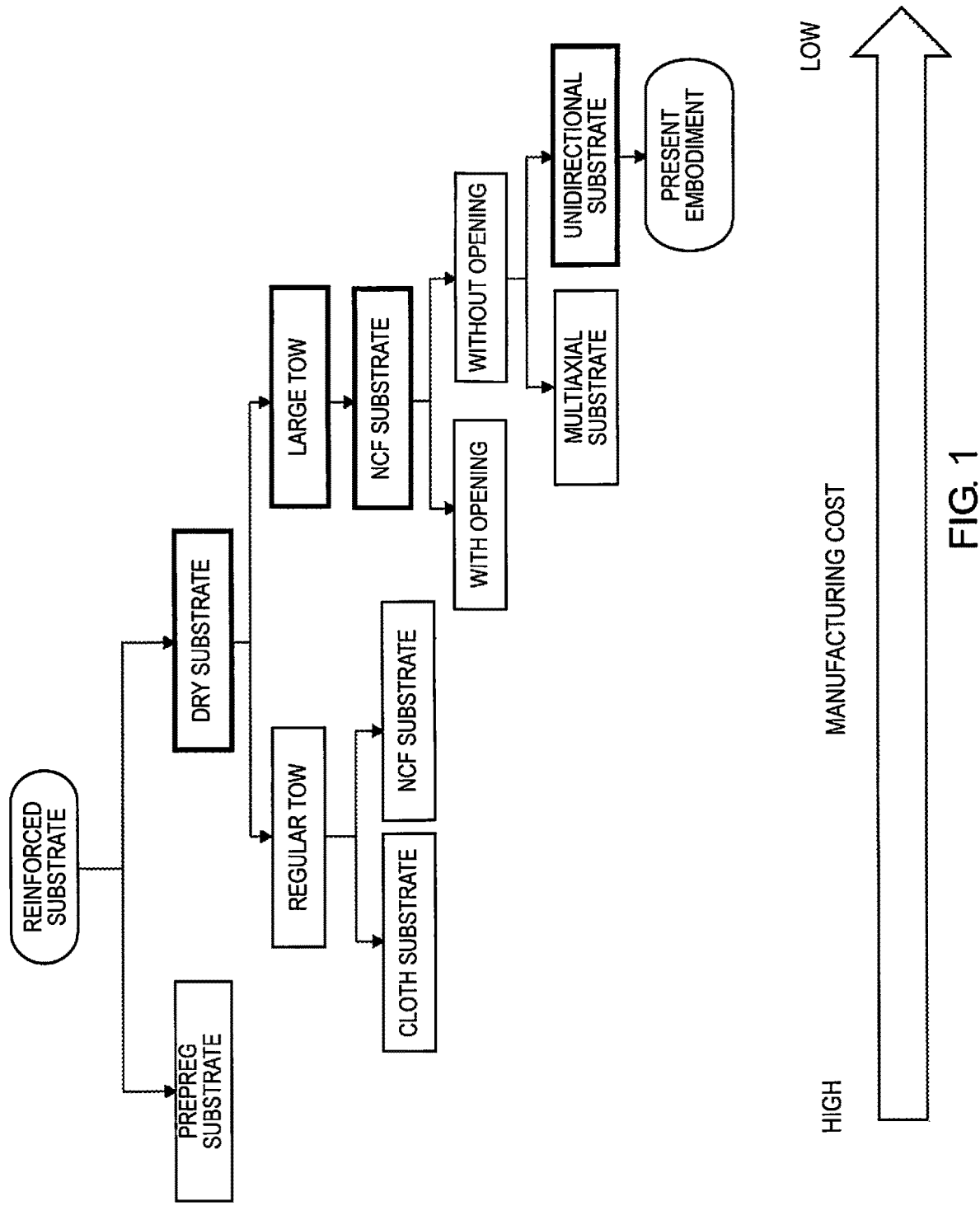
FIG. 1 is a hierarchical diagram showing a relationship between types of reinforced substrates and manufacturing cost.

FIG. 1 is a hierarchical diagram showing types of reinforced substrates categorized in terms of manufacturing cost. FIG. 1 shows that manufacturing cost decreases in progression from left to right.

Describing the hierarchical diagram from the top, firstly, reinforced substrates are broadly classified into two types: prepreg substrates, in which the reinforced substrate has been impregnated with a resin; and dry substrates that have not been impregnated with a resin. Prepreg substrates are expensive to manufacture because the reinforced substrate is impregnated with resin. For this reason, the manufacturing cost of the dry substrates is less than that of the prepreg substrates.

Ordinarily, a dry substrate is formed from fiber bundles in which a plurality of reinforcing fibers are bundled together. The fiber bundles are classified in accordance with the fiber count of the reinforcing fibers into large tows with a relatively high fiber count of the reinforcing fibers, and regular tows with a relatively low fiber count of the reinforcing fibers. Here, the fiber count of the reinforcing fibers of the large tow can be set to, e.g., 40,000 or more, and the fiber count of a regular tow can be set to, e.g., 24,000 or less.

PAN-based carbon fiber is commonly used as a reinforcing fiber. PAN-based carbon fiber is continuously manufactured by way of a flameproofing step, a carbonization step, a graphitization step, a surface treatment step, and a sizing step using a manufacturing line in which bundles of PAN fibers bundled together in a predetermined count are fed in a fiber direction. In such instances, a higher fiber count of the reinforcing fibers in the fiber bundle corresponds to a larger amount of reinforcing fibers that can be manufactured in the same cycle time. Accordingly, the manufacturing cost of a fiber bundle decreases with an increase in the fiber count of the reinforcing fibers being bundled. In other words, a substrate in which large tows are used has a lower manufacturing cost than a substrate in which regular tows is used.

Cloth substrates in which warp and weft are woven into a woven fabric, and NCF substrates in which reinforcing fibers are arranged in a single direction, are ordinarily used as dry substrates.

In a cloth substrate, the warps and wefts are knitted in intersecting fashion, whereby a crimp is formed in which the reinforcing fibers are curved. The curvature of the reinforcing fibers due to the crimp becomes excessively large when large tows are used. Curved reinforcing fibers have less strength than reinforcing fibers extending in rectilinear fashion. Therefore, strength is likely to be dramatically reduced when the cloth substrate is manufactured using large tows. For this reason, cloth substrates have been manufactured using regular tows. However, there is a problem in that regular tows have a higher manufacturing cost and are narrower than large tows, necessitating considerable manufacturing time and resulting in poor productivity.

By contrast, crimps such as those in cloth substrates are not formed in an NCF substrate because the fibers are oriented in a single direction. Consequently, large tows can be used in a reinforced substrate. Using large tows in the reinforced substrate makes it possible to bring the manufacturing cost much lower than when only regular tows are used, and productivity will rise. Furthermore, NCF substrates do not require a step for weaving warp and weft; therefore, productivity is higher than with cloth substrates.

A process referred to as "opening" can be performed to make the fiber bundle of the large tow wide and thin. Using the fiber bundle of the large tow without opening makes the opening step unnecessary and increases productivity.

In general, a so-called multiaxial substrate is used as an NCF substrate. In a multiaxial substrate, reinforcing fibers aligned in a single direction are oriented and laminated in two or more directions, and the intersecting reinforcing fibers are stitched and secured together. However, in such a multiaxial substrate, stitching and securing together reinforcing fibers oriented in a plurality of directions may result in lower elongation and inferior shaping properties than in cloth substrates.

Figure 2:
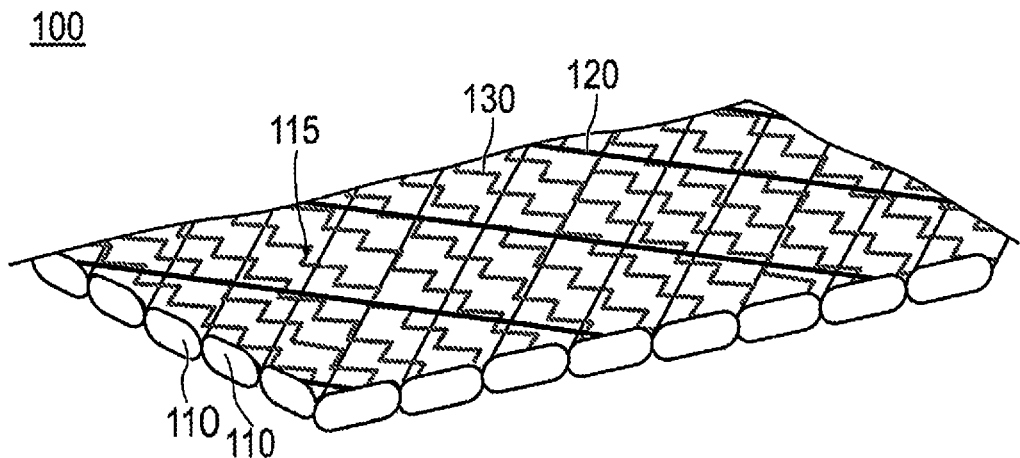
FIG. 2 is a schematic perspective view showing a reinforced substrate according to an embodiment.

Therefore, in the NCF substrate according to an embodiment of the present invention, a so-called unidirectional substrate is used in which the reinforcing fibers are not oriented along multiple axes, but are rather oriented in a single direction, as shown in FIG. 2. This reduces the number of directions in which the reinforcing fibers are stitched and restrained, allowing the elongation of the reinforced substrate to be increased and the shaping properties to be improved. Furthermore, using large tows in the NCF substrate allows the manufacturing cost to be dramatically reduced.

An embodiment of the present invention is described below with reference to the accompanying drawings. The following description does not limit the technical scope or the meaning of terminology set forth in the claims. Also, the dimensional ratios in the drawings may be exaggerated for convenience of description, and may differ from the actual ratios.

Figure 3A:
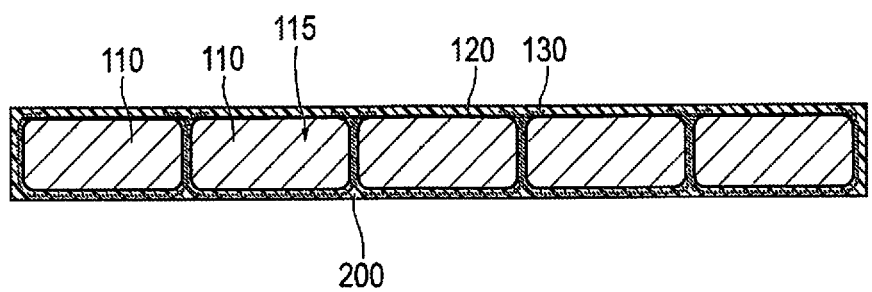
FIG. 3A is a schematic cross-sectional view showing a composite material in which the reinforced substrate shown in FIG. 2 is used.

Referring to FIG. 3A, a composite material 10 has a resin 200 disposed in a reinforced substrate 100. As is well known, combining the resin 200 with the reinforced substrate 100 yields a composite material 10 provided with higher strength and rigidity than those provided solely with the resin 200. The composite material 10 can be applied to, e.g., the framework components of a vehicle body of an automobile and to outer panel components. Since the composite material 10 is more lightweight than a steel material, a vehicle body can be made lighter than a vehicle body made of assembled components comprising a steel material.

Examples of the resin 200 include epoxy resins, urethane resins, unsaturated polyester resins, phenol resins, and other thermosetting resins, as well as polyamide (PA) resins, polypropylene (PP) resins, and other thermoplastic resins. In the present embodiment, an epoxy resin having exceptional mechanical properties and dimensional stability is used. Epoxy resins are primarily a two-component type and are used by mixing together a main agent and a curing agent. A bisphenol-A type epoxy resin is ordinarily used as the main component, and an amine-based curing agent is ordinarily used, but there is no particular limitation thereto, and selection can be made as appropriate in accordance with desired material properties.

A mold release agent may be compounded with the resin 200 to allow the composite material 10 to be readily released from the mold after molding. The type of mold release agent is not particularly limited, and any well-known mold release agent can be used.

As a general description, the reinforced substrate 100 has: a reinforcing layer 115 in which a fiber direction of reinforcing fibers 110 is aligned in a single direction; and auxiliary fibers 120 that are laminated on the reinforcing layer 115 so as to follow only one direction intersecting the fiber direction, and that are joined to the reinforcing fibers 110 to hold the reinforcing layer 115, as shown in FIG. 2. The auxiliary fibers 120 have a higher tensile elongation at break than do the reinforcing fibers 110. The present embodiment further has a stitching yarn 130 for stitching and joining the reinforcing fibers 110 and the auxiliary fibers 120 together.

Fiber bundles of the large tows are aligned in an unopened state in the reinforcing layer 115, the large tows having a higher fiber count of the reinforcing fibers than does a regular tow. Here, the fiber count of the reinforcing fibers of the large tows is ordinarily about 40,000 or more, and roughly about 40,000 to about 50,000. In the present embodiment, the fiber count of the reinforcing fibers is about 50,000. By contrast, the fiber count of the reinforcing fibers of the regular tow is ordinarily about 24,000 or less, and roughly about 12,000 to about 24,000.

Examples of a material constituting the reinforcing fibers 110 include carbon fiber, glass fiber, aramid fiber, polyamide (PA) fiber, polypropylene (PP) fiber, and acrylic fiber. In the present embodiment, an example in which carbon fiber is used for the reinforcing fibers 110 will be described. Carbon fiber is characterized by having a low coefficient of thermal expansion, exceptional dimensional stability, and minimal degradation in mechanical properties even at high temperatures, and can therefore be advantageously used as a reinforced substrate for a composite material 10 such as a vehicle body for an automobile.

A basis weight per layer of the reinforcing layer 115 (fiber weight per unit area ($g/m^2$)) may be 50 to 400 $g/m^2$, and is more preferably 300 to 400 $g/m^2$. When the basis weight per layer of the reinforcing layer 115 is less than 300 $g/m^2$, a step for opening the large tows is required, making it difficult to reduce the manufacturing cost. When the basis weight per layer of the reinforcing layer 115 exceeds 400 $g/m^2$, the number of laminated layers decreases when the thickness is the same, and although workability is improved, the freedom to choose the plate thickness dimension is limited. Accordingly, setting the basis weight per layer of the reinforcing layer 115 to a range of 300 to 400 $g/m^2$ makes it possible to reduce the manufacturing cost and to flexibly select dimensions that correspond to product design.

The auxiliary fibers 120 are joined to at least some of the reinforcing fibers 110 by the stitching yarn 130 to hold the reinforcing layer 115. The auxiliary fibers 120 are laminated on the reinforcing layer 115 so as to follow only one direction intersecting the fiber direction of the reinforcing fibers 110. In the present embodiment, the auxiliary fibers 120 are arranged in a direction orthogonal to the fiber direction of the reinforcing fibers 110. Because the auxiliary fibers 120 are arranged along only a single direction, a mesh-form arrangement is ordinarily not included. However, even if the auxiliary fibers 120 are arranged in a mesh form and joined to the reinforcing fibers 110, the interpretation should still be that the auxiliary fibers 120 are arranged along only a single direction if substantially the same amount of elongation can be achieved as in a unidirectional substrate in which the reinforcing fibers 110 are oriented in a single direction.

A material having a higher tensile elongation at break than do the reinforcing fibers 110 is used for the auxiliary fibers 120. This makes the auxiliary fibers 120 less likely to break than do the reinforcing fibers 110, and the reinforcing layer 115 can therefore be reliably held.

A material having a lower modulus of elasticity than the reinforcing fibers 110 is furthermore preferably used for the auxiliary fibers. This allows the auxiliary fibers 120 to deform flexibly in association with the deformation occurring when the reinforced substrate 100 is shaped, and to hold the reinforcing layer 115 reliably and without breaking.

Examples of the material constituting the auxiliary fibers 120 include glass fiber, aramid fiber, carbon fiber, nylon fiber, and polyethylene (PE) fiber. Because carbon fiber is used for the reinforcing fibers 110 in the present embodiment, glass fiber having a lower modulus of elasticity and a higher tensile elongation at break than carbon fiber is used for the auxiliary fibers. Glass fiber has relatively high strength and low material cost, and can therefore be advantageously used for the auxiliary fibers 120.

An example of the conditions in effect when the auxiliary fibers 120 are arranged will be described with reference to FIG. 3B.

Figure 3B:
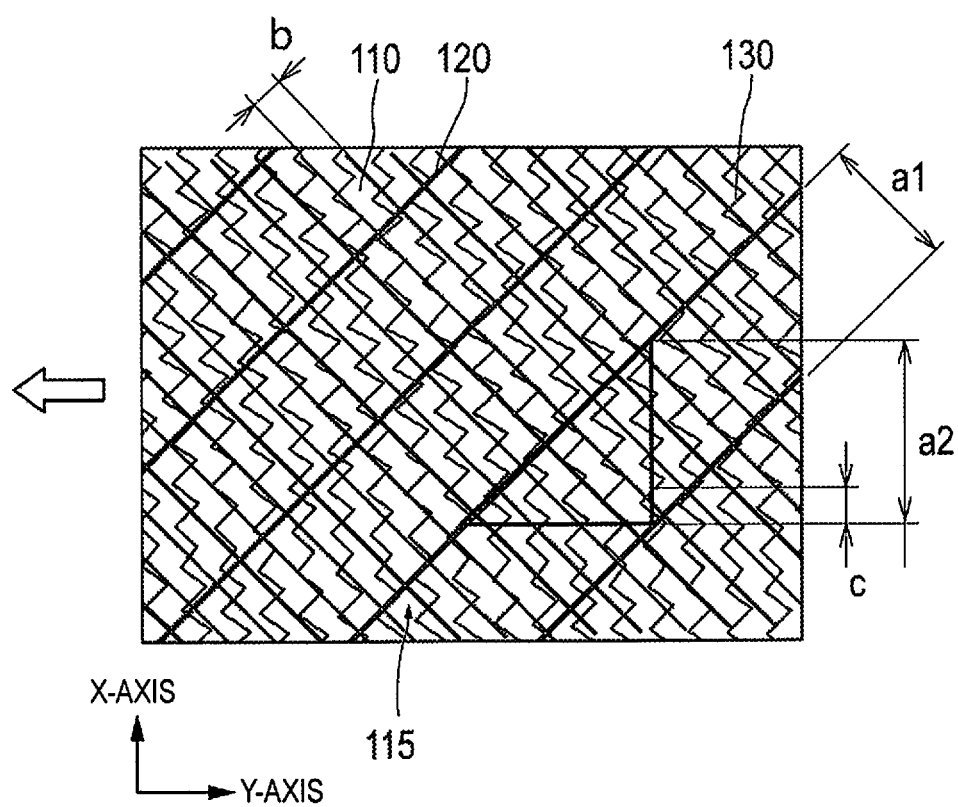
FIG. 3B is a view showing an example of conditions applicable when auxiliary fibers are arranged.

As shown in FIG. 3B, the y-axis is a fiber feed direction indicated by the outline arrow, and the x-axis is a direction orthogonal to the fiber feed direction Y. The following are the dimensions shown in the drawing: a1 (the interval of the auxiliary fibers 120 (parallel)), b (the width of the bundles of reinforcing fibers 110 (parallel)), a2 (the interval of the auxiliary fibers 120 (x-axis)), and c (the interval of the stitching yarn 130 (x-axis)). An example of the ratios between the reinforcing fibers 110 and the auxiliary fibers 120 can be shown as follows:

a1 (the interval of the auxiliary fibers 120 (parallel)) is 3-6 times as great as b (the width of the bundles of reinforcing fibers 110 (parallel))

a2 (the (x-axis) interval of the auxiliary fibers 120) is 3-6 times as great as c (the interval of the stitching yarn 130 (x-axis))

The value of a1 (the interval of the auxiliary fibers 120 (parallel)) can be set to be 3 to 6 times b (the width of the bundle of the reinforcing fibers 110 (parallel)), where b is 1. The value of b (the width of the bundle of reinforcing fibers 110 (parallel)) can also be indicated using the interval of the stitching yarn 130. In this case, a2 (the interval of the auxiliary fibers 120 (x-axis)) can be set to be 3 to 6 times c (the interval of the stitching yarn 130 (x-axis)), where c is 1. Setting the arrangement conditions of the auxiliary fibers 120 as described above makes it possible to improve the shaping properties of the reinforced substrate 100 and to minimize wrinkling when the reinforced substrate 100 is shaped.

The count and diameter of the auxiliary fibers 120 are determined from the viewpoint of ensuring a tensile strength at the time of substrate formation and ensuring a strength capable of withstanding a shaping force generated during shaping. In the case of glass fiber, the count is desirably about 500 to 6,000. In the present embodiment, 1,000 glass fibers are used. However, auxiliary fibers 120 provided with greater than necessary strength are undesirable due to the resulting extraneous increase in the cost or the weight of the reinforced substrate.

The greatest reinforcing effect can be obtained when the orientation angle between the reinforcing fibers 110 and the auxiliary fibers 120 is 90°. However, based on design requirements, it is also possible to set an orientation angle other than 90°. The orientation angle is preferably set to 30-120°. In the embodiment, the reinforcing fibers 110 and the auxiliary fibers 120 are oriented so that the orientation angle is 90°.

In the present embodiment, the auxiliary fibers 120 are laminated so as to intersect the reinforcing fibers 110, and the points of intersection of the auxiliary fibers 120 and the reinforcing fibers 110 are secured by the stitching yarn 130. Accordingly, the reinforcing fibers 110 can be prevented from separating from each other, and handling of the reinforced substrate 100 is facilitated in the process of conveyance, cutting, shaping, and molding of the reinforced substrate 100. Furthermore, the aligned state of the reinforcing fibers 110 can be maintained by the auxiliary fibers 120 and the stitching yarn 130.

Apparatus for Manufacturing Reinforced Substrate

An apparatus 300 for manufacturing the reinforced substrate 100 will be described below with reference to FIG. 4.

The manufacturing apparatus 300 has a plurality of bobbins 310, an orientation section 320, a laminating section 330, a stitching section 340, a belt conveyor 350, and a windup roller 360.

Figure 5:
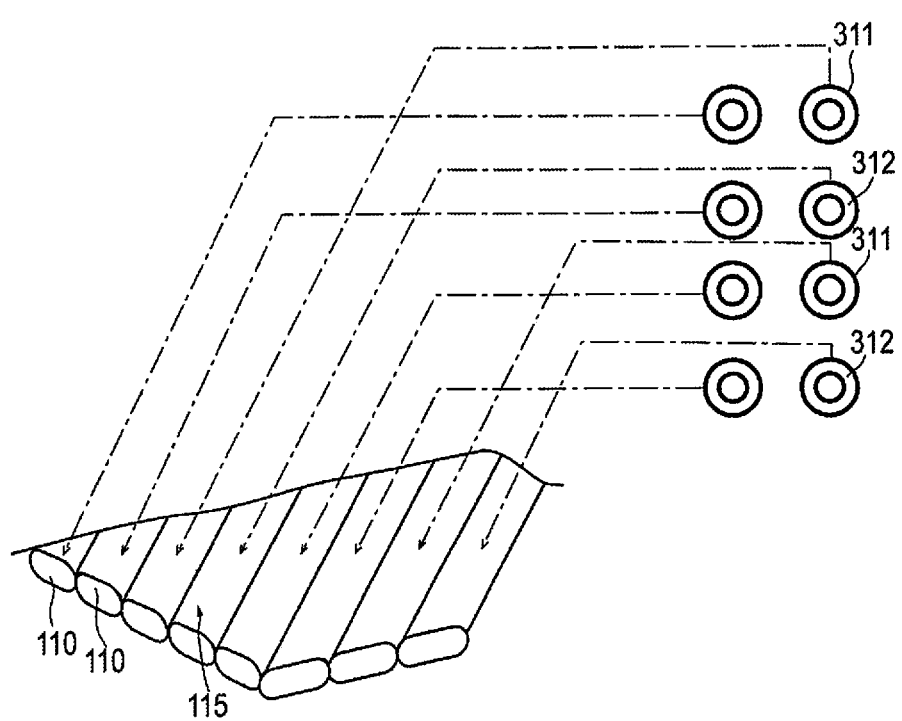
FIG. 5 is a schematic view showing an arrangement of bobbins of the apparatus for manufacturing the reinforced substrate.

The plurality of bobbins 310 hold the reinforcing fibers 11.0 and the auxiliary fibers 120, which are in a wound-up state, so as to allow the fibers to be drawn out. The bobbins 310 are provided with a first bobbin 311 and a second bobbin 312 on which the reinforcing fibers 110 are wound, and a third bobbin 313 on which the auxiliary fibers 120 are wound. The first bobbin 311 and the second bobbin 312 are arranged so that the reinforcing fibers 110 drawn out from each of the bobbins 311, 312 are lined up in alternating fashion in a planar manner along the direction intersecting the fiber direction, as shown in FIG. 5.

The orientation section 320 orients and arranges the reinforcing fibers 110 in a predetermined fiber direction. The laminating section 330 laminates the auxiliary fibers 120 on the arranged reinforcing fibers 110.

Figure 8A:
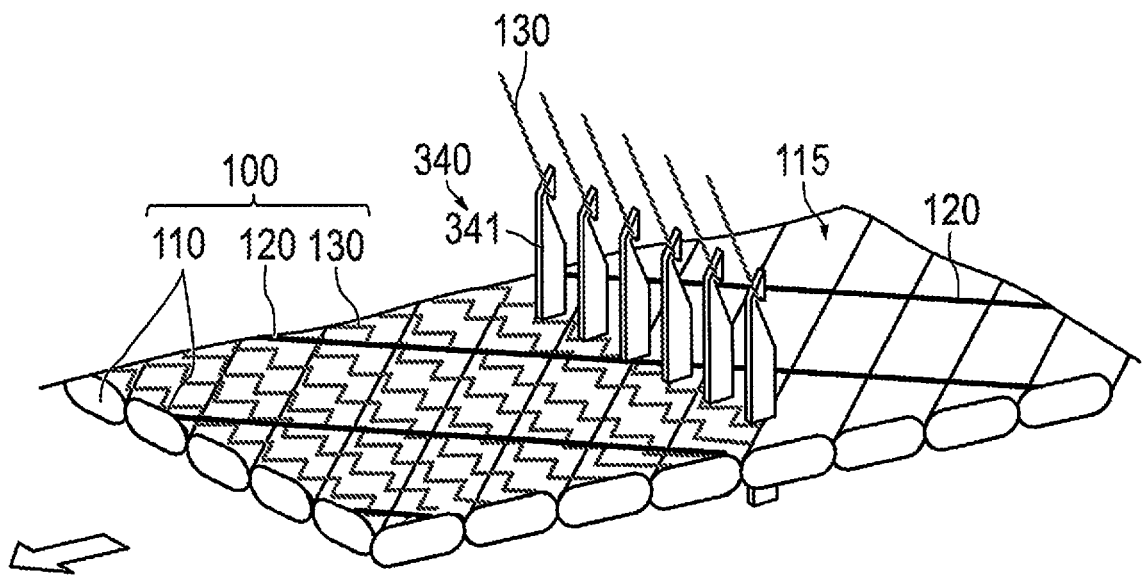
FIG. 8A is a view illustrating a procedure for manufacturing the reinforced substrate using the apparatus for manufacturing the reinforced substrate, and is a schematic view showing a stitching step.
Figure 8B:
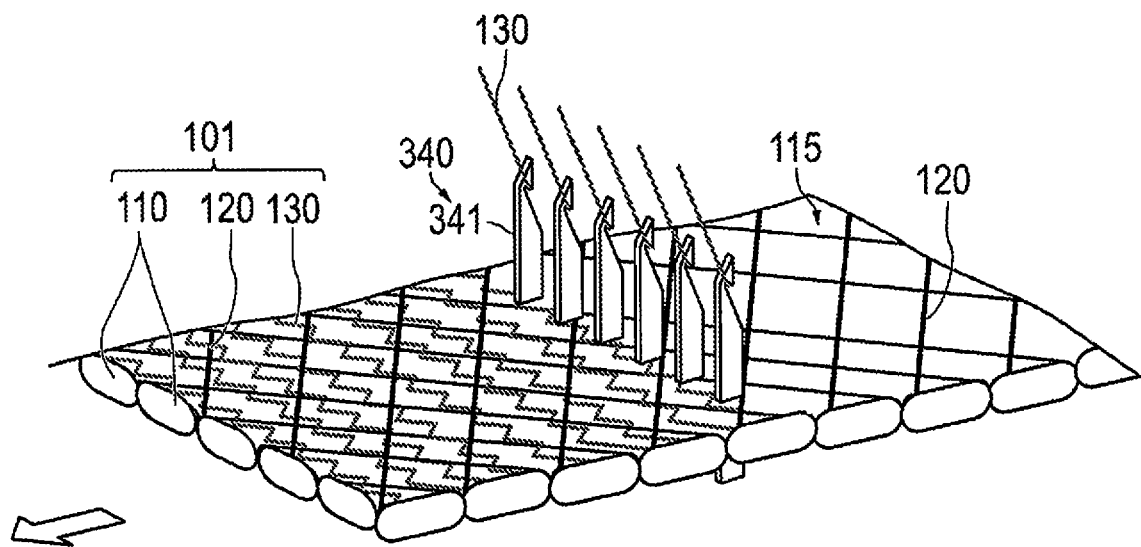
FIG. 8B is a view illustrating the procedure for manufacturing the reinforced substrate using the apparatus for manufacturing the reinforced substrate, and is a schematic view showing the stitching step.
Figure 8C:
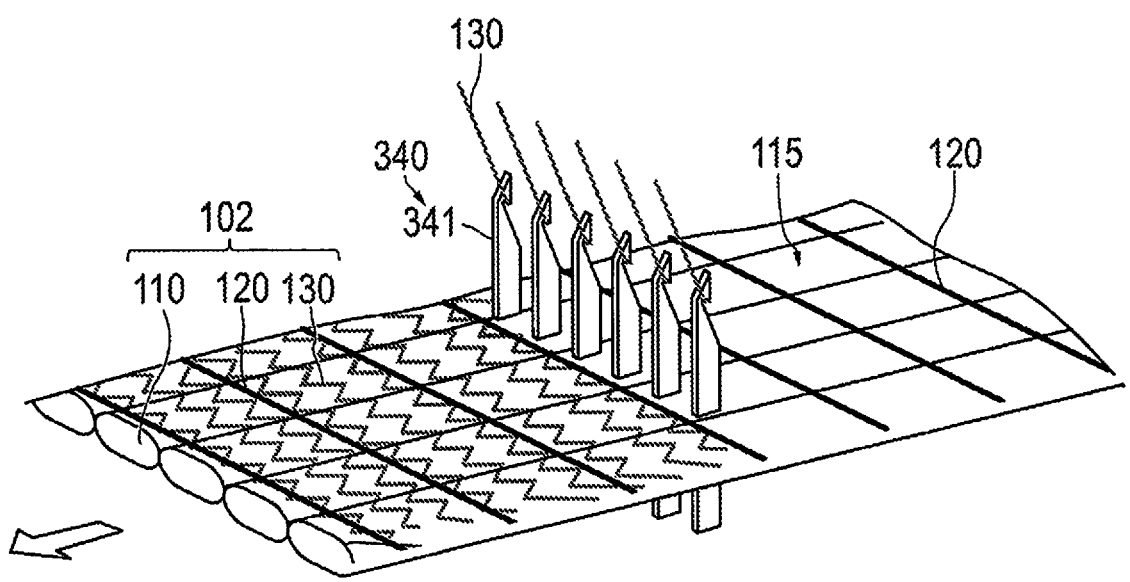
FIG. 8C is a view illustrating the procedure for manufacturing the reinforced substrate using the apparatus for manufacturing the reinforced substrate, and is a schematic view showing the stitching step.

In the stitching section 340, the reinforcing fibers 110 and the auxiliary fibers 120 are stitched and joined together to form the reinforced substrate 100. As shown in FIGS. 8A-8C, the stitching section 340 is provided with a knitting needle 341 for stitching the reinforcing fibers 110 and the auxiliary fibers 120 by using the stitching yarn 130.

The belt conveyor 350 continuously conveys the reinforcing fibers 110 and the auxiliary fibers 120. The configuration for conveying the reinforcing fibers 110 and the auxiliary fibers 120 is not limited to the belt conveyor 350, and may involve, e.g., a conveyance robot.

The windup roller 360 winds up and holds the reinforced substrate 100 in a roll.

The functioning of the manufacturing apparatus 300 is controlled by a control unit 500. The configuration of the control unit 500 will be described in further detail below.

Apparatus for Molding Composite Material

Figure 6:
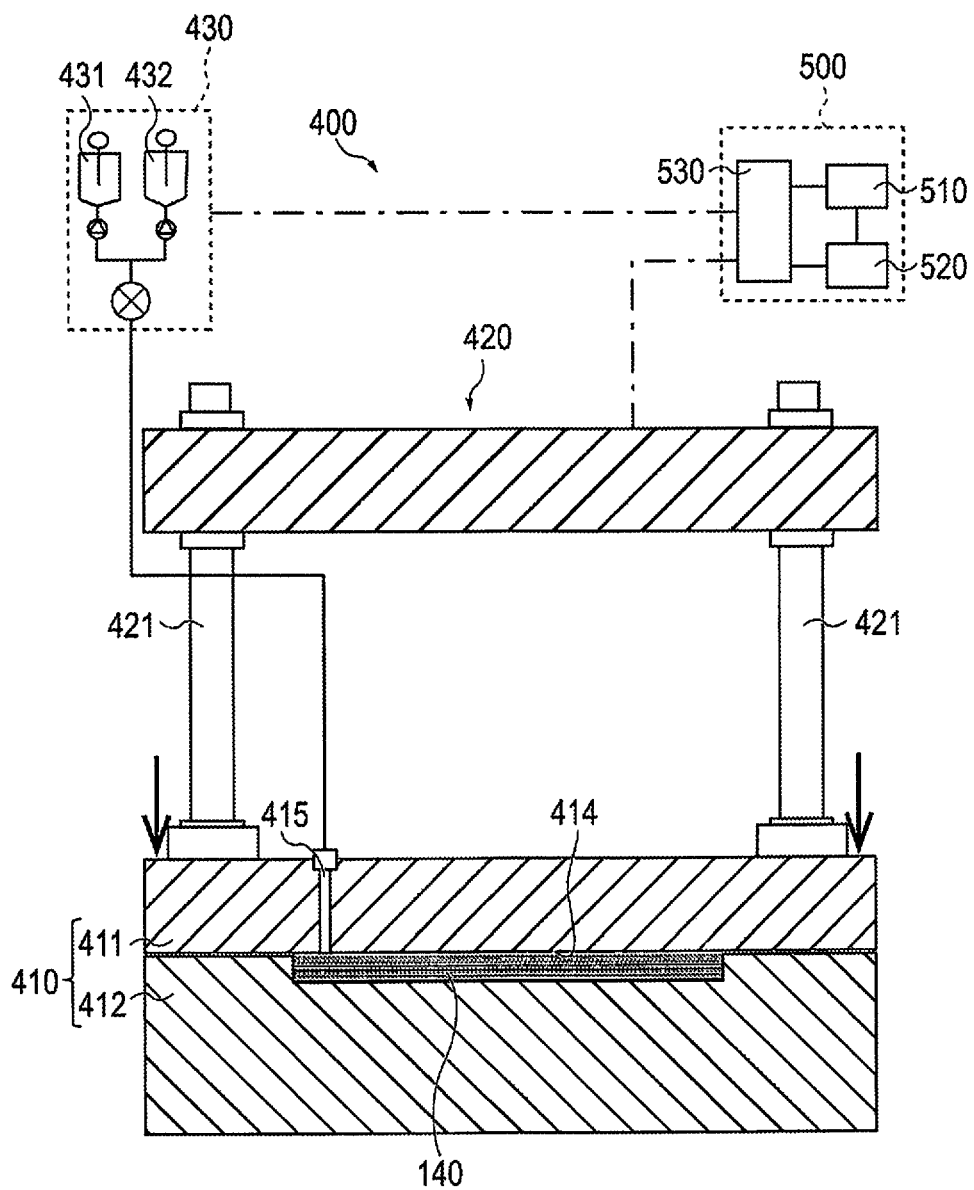
FIG. 6 is a schematic view showing an apparatus for molding the reinforced substrate.

An apparatus 400 for molding the composite material 10 will be described with reference to FIG. 6.

The apparatus 400 for molding the composite material 10 has: an openable/closable mold 410 that forms a cavity 414 in which a laminate 140 (see FIG. 10) is arranged, the laminate having a plurality of laminated reinforced substrates 100, 101, 102; a press section 420 for applying a clamping pressure to the mold 410; and a resin injection section 430 for injecting the resin 200 into the cavity 414.

The mold 410 has: a pair of openable/closable molds, namely, an upper mold 411 and a lower mold 412; and an injection port 415 through which the resin 200 is injected into the cavity 414.

The injection port 415 is provided so that the cavity 414 and the resin injection portion 430 can communicate with each other. The interior of the laminate 140 is impregnated through the surface with the resin 200 injected from the resin injection section 430. A suction port for suctioning air by evacuating the interior of the cavity 414 may be separately provided to the mold 410.

The press section 420 is provided with a cylinder 421 in which hydraulic pressure or other fluid pressure is used, and can be configured from a press capable of adjusting the clamping pressure applied to the mold 410 by controlling the hydraulic pressure or the like.

The resin injection section 430 is configured from a known circulation-type pump mechanism capable of supplying a main agent supplied from a main agent tank 431 and a curing agent supplied from a curing agent tank 432 to the mold 410 while circulating the main agent and the curing agent. The resin injection section 430 communicates with the injection port 415 and injects the resin 200 into the cavity 414.

The control unit 500 controls the functioning of the manufacturing apparatus 300 and the molding apparatus 400. Referring to FIGS. 4 and 6, the control unit 500 has a storage unit 510, a computation unit 520, and an input/output unit 530 via which a variety of data and control instructions are sent and received. The input/output unit 530 is electrically connected to the bobbins 310, the orientation section 320, the laminating section 330, the stitching section 340, the belt conveyor 350, the windup roller 360, the press section 420, the resin injection section 430, and other device sections.

The storage unit 510 is configured from ROM and RAM, and stores data for, inter alia, an arrangement of the reinforcing fibers 110, the auxiliary fibers 120, and the stitching yarn 130. The computation unit 520 is mainly composed of a CPU, and receives data for, inter alia, an arrangement of the reinforcing fibers 110 and the auxiliary fibers 120 via the input/output unit 530. The computation unit 520 calculates, inter alia, the arrangement of the auxiliary fibers 120 and positions at which the auxiliary fibers are stitched by the stitching yarn 130, the calculations being performed on the basis of data read out from the storage unit 510 and data received from the input/output unit 530. Control signals based on the calculated data are transmitted to the bobbins 310, the orientation section 320, the laminating section 330, the stitching section 340, the belt conveyor 350, the windup roller 360, the press section 420, the resin injection section 430, and the like via the input/output unit 530. Thus, the control unit 500 controls, inter alia, the arrangement of the reinforcing fibers 110, the auxiliary fibers 120, and the stitching yarn 130 in the reinforced substrate 100.

Method for Manufacturing Reinforced Substrate

Described next is a method for manufacturing the reinforced substrates 100, 101, 102 according to an embodiment.

In the present embodiment, three types of reinforced substrates 100, 101, 102 are manufactured, namely, a reinforced substrate 100 in which a fiber direction θ of the reinforcing fibers 110 is +45° (see FIGS. 2 and 8A), a reinforced substrate 101 in which the fiber direction θ is −45° (see FIG. 8B), and a reinforced substrate 102 in which the fiber direction θ is 0° (see FIG. 8C). The arrows in FIGS. 4, 8A to 8C, 9A, and 9B show a conveyance direction of the reinforcing fibers 110, the fiber direction θ being an angle with respect to the conveyance direction (see FIG. 4).

Figure 7A:
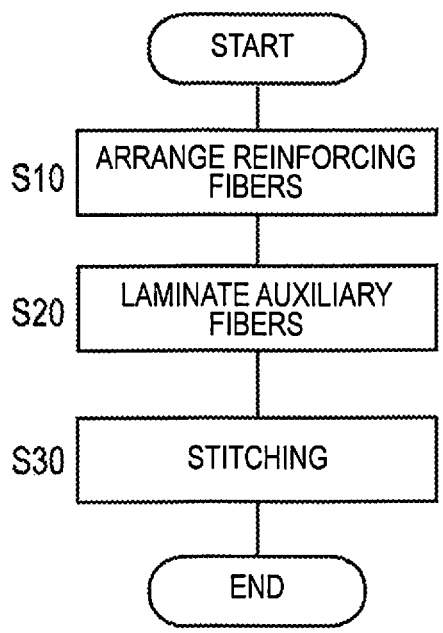
FIG. 7A is a flowchart showing a method for manufacturing the reinforced substrate.

The method for manufacturing the reinforced substrates 100, 101 has a step for arranging the reinforcing fibers 110 (step S10), a step for laminating the auxiliary fibers 120 (step S20), and a step for stitching and joining the reinforcing fibers 110 and the auxiliary fibers 120 together (step S30), as shown in FIG. 7A. Each step is described below.

First, a plurality of first bobbins 311 and a plurality of second bobbins 312 are set in alternating fashion, as shown in FIG. 5.

Figure 4:
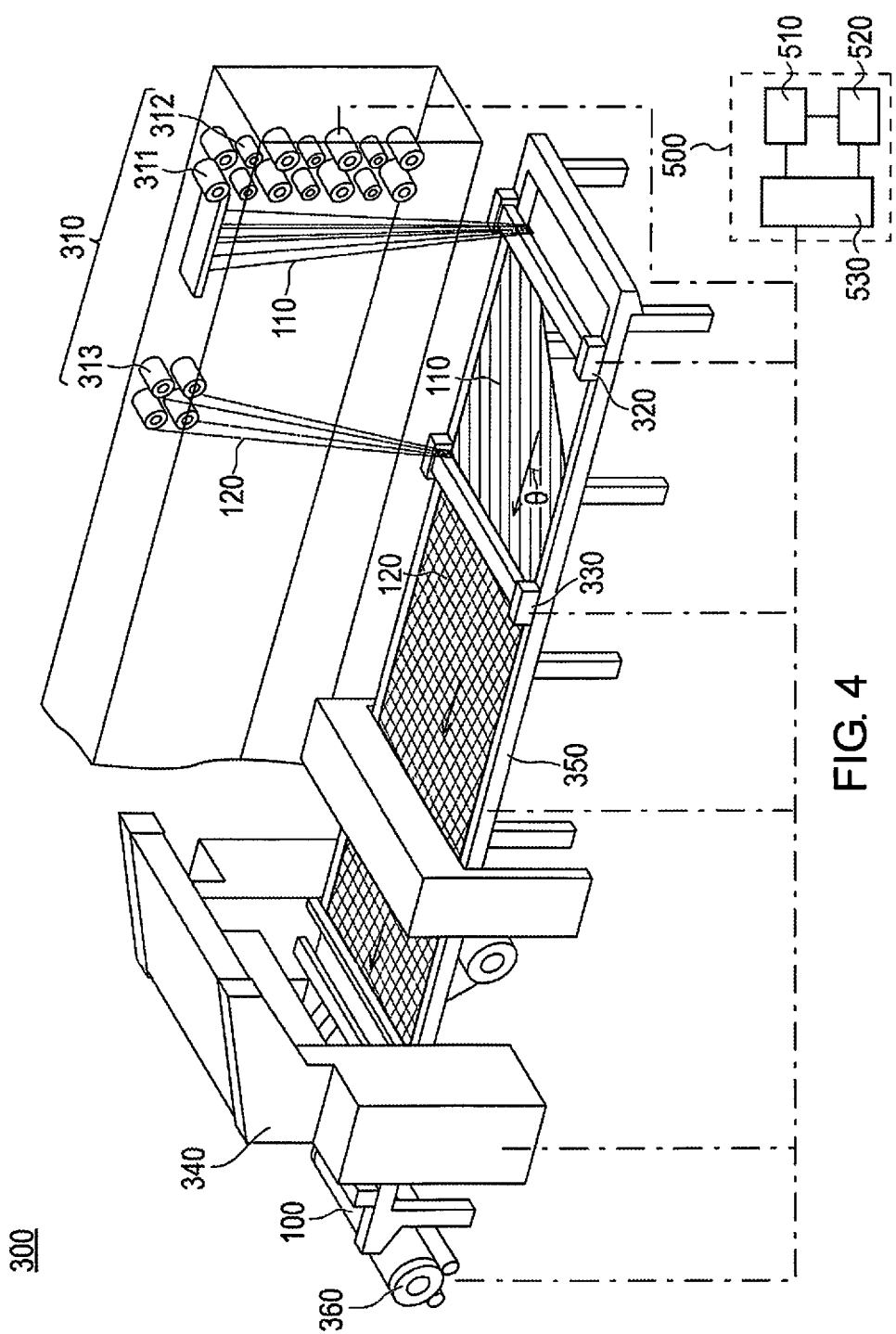
FIG. 4 is a schematic view showing an apparatus for manufacturing the reinforced substrate.

Next, in step S10, the reinforcing fibers 110 are drawn out from the first bobbins 311 and the second bobbins 312 by the orientation section 320, as shown in FIG. 4. The reinforcing fibers 110 are arranged so that the fiber direction θ is a single direction. At this time, the reinforcing fibers 110 drawn out from the respective bobbins 311, 312 are aligned so as to be lined up in alternating fashion in a plane along a direction intersecting the fiber direction θ. The arranged reinforcing fibers 110 are conveyed to the laminating section 330 by the belt conveyor 350.

Next, in step S20, the auxiliary fibers 120 are laminated on the reinforcing fibers 110 by the laminating section 330. At this time, the auxiliary fibers 120 are laminated on the reinforcing fibers 110 so as to follow the direction that intersects the fiber direction θ. In the present embodiment, the auxiliary fibers 120 are arranged in a direction orthogonal to the fiber direction θ.

Next, in step S30, the reinforcing fibers 110 and the auxiliary fibers 120 are stitched and joined together by the stitching yarn 130 using the knitting needle 341 of the stitching section 340. FIG. 8A shows the manner in which the reinforcing fibers 110 having a fiber direction θ of +45° are stitched. FIG. 8B shows the manner in which the reinforcing fibers 110 having a fiber direction θ of −45° are stitched. A sheet-form reinforced substrate 100 having a fiber direction θ of +45° and a sheet-form reinforced substrate 101 having a fiber direction θ of −45° are thereby completed.

In steps S20 and S30, the arrangement of the auxiliary fibers 120 and the positions at which the auxiliary fibers are stitched by the stitching yarn 130 are controlled on the basis of the arrangement of the reinforcing fibers 110. In the present embodiment, the functioning of the orientation section 320, the laminating section 330, and the stitching section 340 is synchronized by the control unit 500 to perform the operation of each process. The reinforcing fibers 110 and the auxiliary fibers 120, which intersect each other, can thereby be reliably stitched by the stitching yarn 130.

The reinforced substrates 100, 101 are then wound up and held in the form of a roll by the windup roller 360.

The reinforced substrate 102 having a fiber direction θ of 0° is formed by laminating the auxiliary fibers 120 in the same manner as the reinforced substrates 100, 101 having fiber direction θ of ±45°, as shown in FIG. 8C, and the reinforcing fibers 110 and the auxiliary fibers 120 are stitched together by the stitching yarn 130.

Figure 9A:
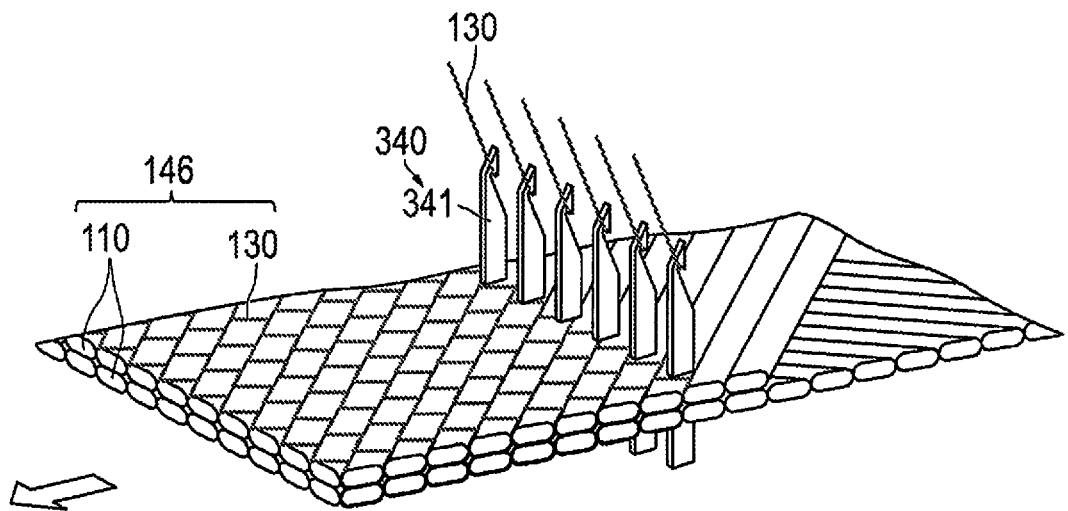
FIG. 9A is a view illustrating a procedure for manufacturing the reinforced substrate according to a comparative example, and is a schematic view showing the stitching step.

In the case that the reinforced substrate is a multiaxial substrate, the reinforcing fibers 110 aligned in a single direction are oriented and laminated in two or more directions, as shown in FIG. 9A, and the intersecting reinforcing fibers 110 are stitched together by the stitching yarn 130. Accordingly, the reinforcing fibers 110 deform less readily and the shaping properties dramatically deteriorate. The reinforced substrates 100, 101, 102 according to the present embodiment are unidirectional substrates in which the reinforcing fibers 110 aligned in a single direction are used. Therefore, the reinforced substrates 100, 101, 102 can have much better shaping properties than a multiaxial substrate.

Method for Molding Composite Material

Next, the method for molding the composite material 10 according to an embodiment will be described. Resin transfer molding (RTM), which offers high productivity and is suitable for mass production, is used as a method for molding the composite material 10. In the RTM method, the composite material 10 is molded by arranging the reinforced substrate 100 in the mold 410 (see FIG. 6), and impregnating and curing the resin 200.

Figure 7B:
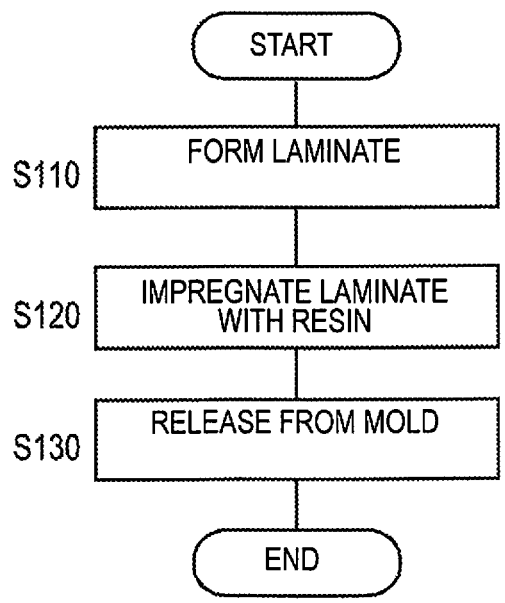
FIG. 7B is a flowchart showing a method for molding the composite material.

The method for manufacturing the composite material 10 has a step for forming the laminate 140 (step S110), a step for impregnating the laminate 140 with the resin 200 (step S120), and a step for removing the composite material 10 from the mold (step S130), as shown in FIG. 7B. Each step is described below.

First, the reinforced substrates 100, 101, 102 wound up on the windup roller 360 are prepared by being drawn out and cut to a predetermined size.

Figure 10:
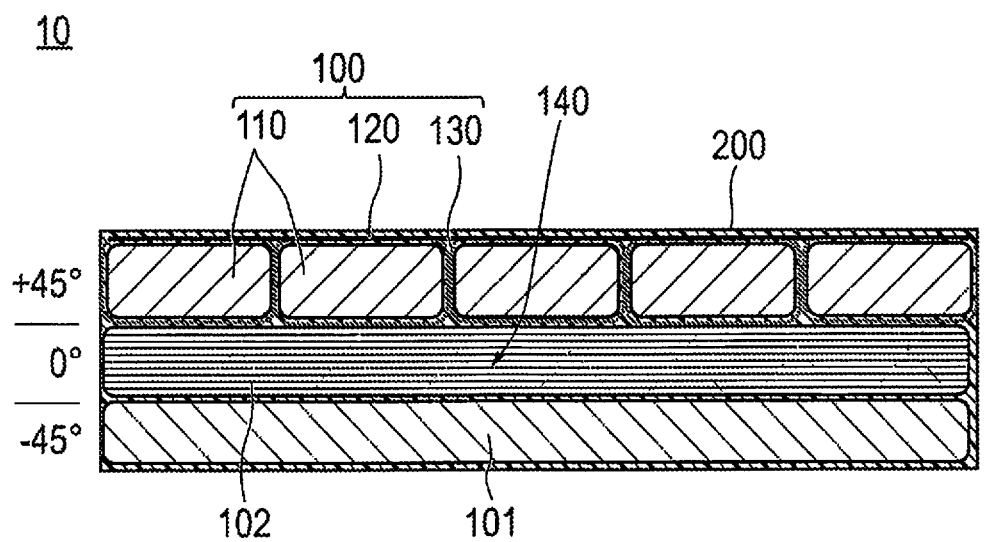
FIG. 10 is a schematic cross-sectional view showing a laminate obtained by laminating the reinforced substrate according to the present embodiment.

Next, in step 5110, the reinforced substrates 100, 101, 102 are laminated in a predetermined laminated configuration to form the laminate 140. In the present embodiment, the reinforced substrate 102 is laminated so as to be sandwiched from both sides by the reinforced substrates 100, 101, as shown in FIG. 10. The laminated configuration becomes +45°/0°/−45° and is an asymmetric lamination. "Asymmetric" means that the fiber directions are laminated asymmetrically with respect to a center plane of the laminate 140 in the lamination direction. This laminated configuration is not given by way of limitation, and can be selected as appropriate depending on material properties required for the composite material 10 shaped as a molded article.

Figure 11:
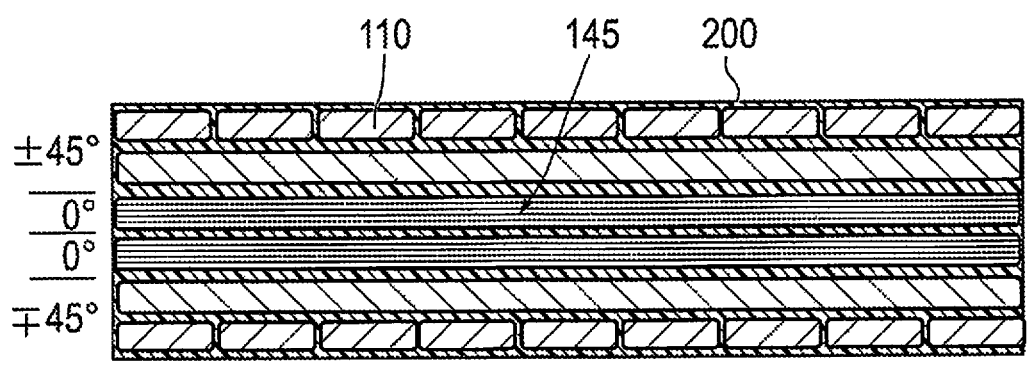
FIG. 11 is a schematic cross-sectional view showing a laminate obtained by laminating the reinforced substrate according to the comparative example.

In general, the laminate 145 is layered symmetrically in a ±45°/0°/0°/±45° laminated configuration, as shown in FIG. 11, whereby the laminate 145 is configured so that any warping between the laminations is eliminated. "Symmetry" means that laminating is performed with the fiber directions in symmetry with reference to the center plane of the laminate in the laminating direction. Because of the large basis weight of the reinforced substrates 100, 101, 102 in which large tows are used as in the present embodiment, the composite material 10 becomes unnecessarily thick when symmetrical lamination is carried out. This makes it difficult to design the composite material to a desired thickness. Therefore, in the present embodiment, the lamination is configured asymmetrically, as shown in FIG. 10. This makes it possible to minimize any unnecessary increase in the thickness of the composite material 10.

The resin 200 is subsequently injected into the cavity 414 of the mold 410 to impregnate the laminate 140 with the resin 200 in step S120. The mold 410 is then gradually heated so that a temperature thereof is raised to a curing temperature of the resin 200 to cure the resin 200. When the resin 200 is a thermoplastic resin, the mold 410 may be cooled to bring about curing.

The resin 200 is subsequently cured in step 5130, the mold 410 is then opened, and the composite material 10 is released from the mold to complete molding.

Shaping Experiment

Described below is a shaping experiment carried out using the laminate 140 of the reinforced substrate according to the embodiment and a laminate 145 of a reinforced substrate according to a comparative example.

The laminate 140 of the embodiment has a three-layer structure with a laminated configuration of +45°/0°/−45°, as shown in FIG. 10. The reinforced substrate 100, the reinforced substrate 101, and the reinforced substrate 102 of each layer are shown in FIGS. 8A, 8B, and 8C, respectively. Carbon fiber is used for the reinforcing fibers 110, and glass fiber is used for the auxiliary fibers 120. The fiber bundles of the large tows are aligned in an unopened state in the reinforcing layer 115. The basis weight per layer of the reinforcing layer 115 in each of the reinforced substrates 100, 101, 102 is 300 g/m². The reinforced substrate according to the embodiment has a three-layer structure, and the total basis weight is 900 g/m².

Figure 9B:
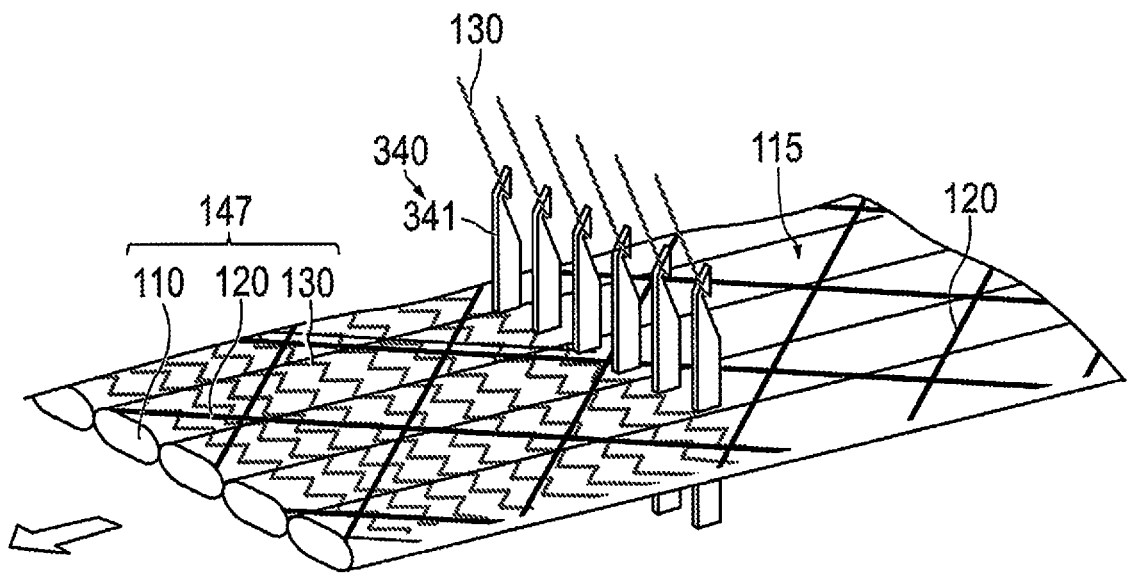
FIG. 9B is a view illustrating the procedure for manufacturing the reinforced substrate according to the comparative example, and is a schematic view showing the stitching step.

The laminate 145 of the comparative example has a six-layer structure with a laminated configuration of ±45°/ 0°/0°/±45°, as shown in FIG. 11. A reinforced substrate 146 having a fiber direction θ of ±45° is shown in FIG. 9A. A reinforced substrate 147 having a fiber direction θ of 0° is shown in FIG. 9B. The auxiliary fibers 120 in the reinforced substrate 147 are formed as a mesh and hold the reinforcing layer 115. Carbon fiber is used for the reinforcing fibers 110, and glass fiber is used for the auxiliary fibers 120. The fiber bundles of large tows are opened and aligned in the reinforcing layer 115. The basis weight per layer of the reinforcing layer 115 in each reinforced substrate 146, 147 is 150 g/m². The reinforced substrate according to the comparative example has a six-layer structure, and therefore the total basis weight is 900 g/m². The thickness is the same as that of the reinforced substrate according to the embodiment.

Figure 12:
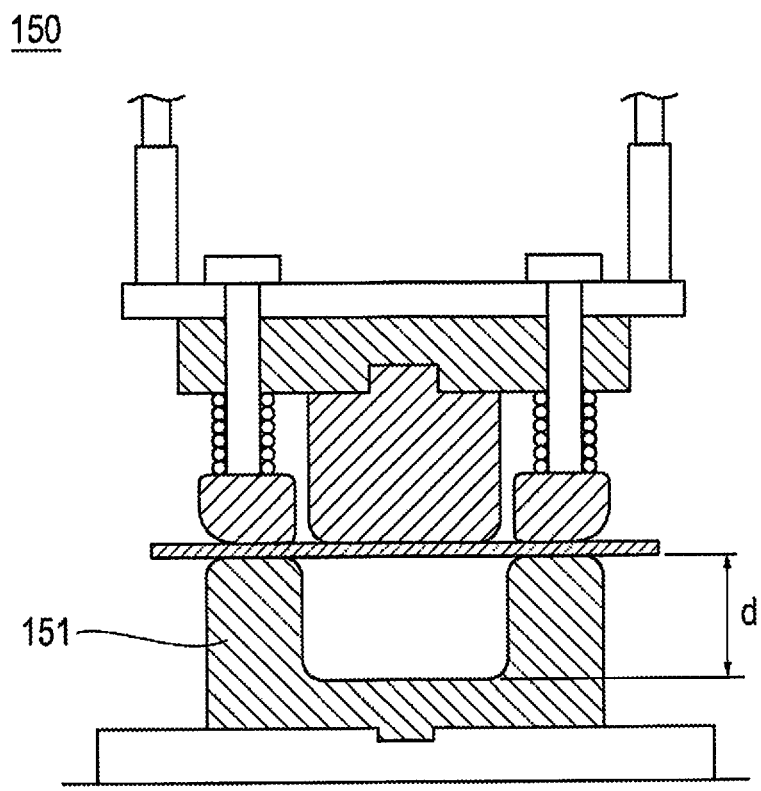
FIG. 12 is a schematic cross-sectional view showing an embossing shaping mold used in a shaping experiment.

Shaping was carried out using an embossing shaping mold 150 that allows a draw depth d (emboss depth) to be adjusted, as shown in FIG. 12. The embossing shaping mold 150 can be attached by switching out a lower die 151 having a different draw depth d. The draw depth d is thereby adjusted.

Figure 13A:
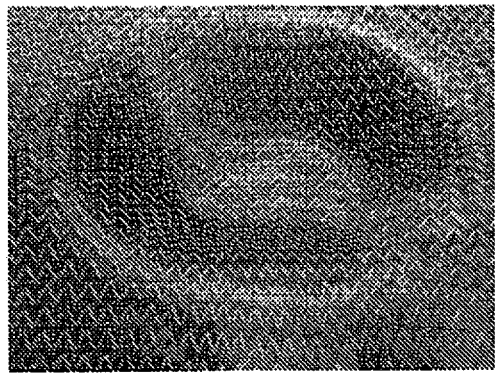
FIG. 13A is a view showing a result of shaping the laminate obtained by laminating the reinforced substrate according to the embodiment, and is a view showing a recessed side of the embossment turned upward.
Figure 13B:
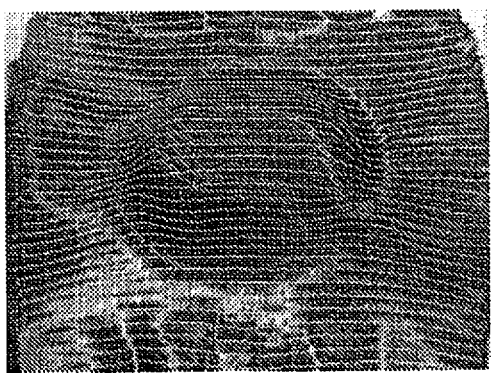
FIG. 13B is a view showing a result of shaping the laminate obtained by laminating the reinforced substrate according to the embodiment, and is a view showing a protruding side of the embossment turned upward.
Figure 14A:
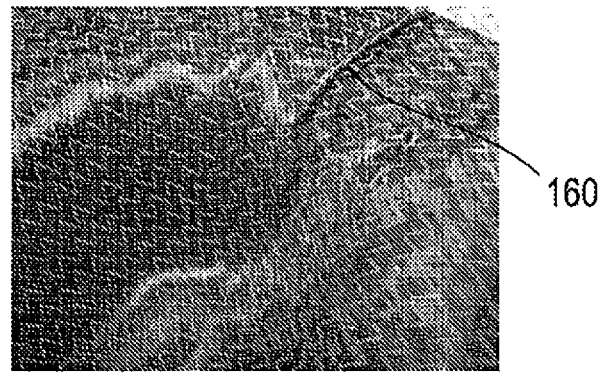
FIG. 14A is a view showing a result of shaping the laminate obtained by laminating the reinforced substrate according to the comparative example, and is a view showing the recessed side of the embossment turned upward.
Figure 14B:
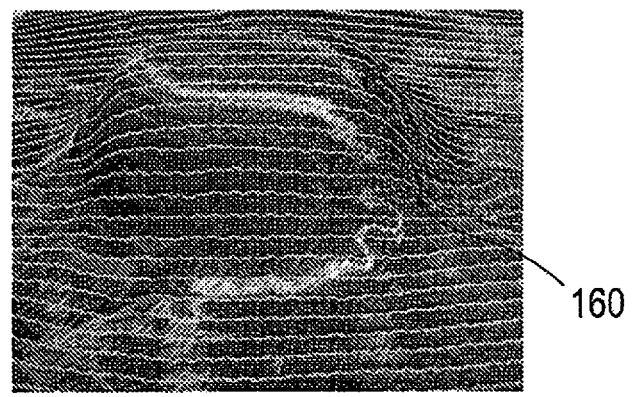
FIG. 14B is a view showing a result of shaping the laminate obtained by laminating the reinforced substrate according to the comparative example, and is a view showing the protruding side of the embossment turned upward.

FIGS. 14A and 14B show a result in which a wrinkle 160 is produced when the laminate 145 of the comparative example has been shaped. FIGS. 13A and 13B show a result of shaping the laminate 140 of the embodiment under the same draw depth conditions. FIGS. 13A and 14A are views showing a recessed side of the embossment turned upward, and FIGS. 13B and 14B are views showing a protruding side of the embossment turned upward.

Figure 15:
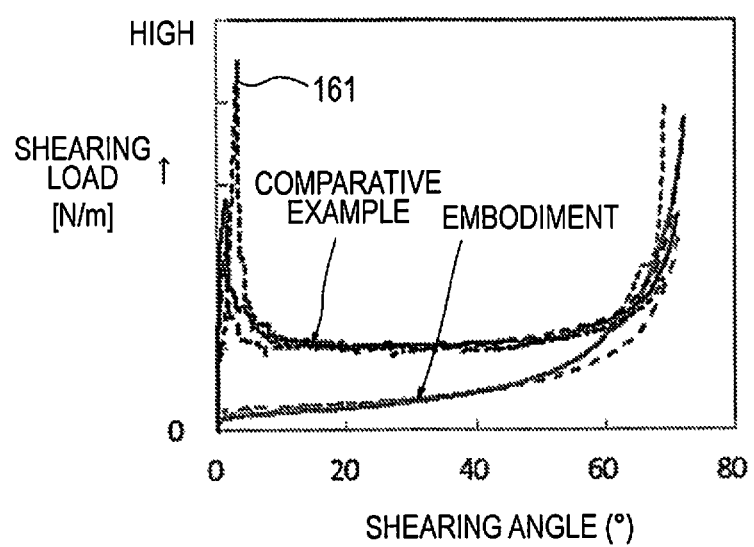
FIG. 15 is a graph showing the relationship between an elongation and a load of the reinforced substrate.

FIG. 15 is a graph showing a relationship between an elongation and a load of the reinforced substrate. In the graph, the laminate 140 of the embodiment and the laminate 145 of the comparative example were tested by a picture frame method. In the graph, the horizontal axis shows a shear angle, and the vertical axis shows a shear load. The shear angle represents the elongation of the substrate. The picture frame method is a test method in which four sides of the laminates 140, 145 cut out into square form are secured by a rectangular frame and pulled along a diagonal line. Shear deformation is thereby produced in the laminates 140, 145, and the corresponding load and shearing angle are obtained.

In the comparative example, the reinforcing fibers 110 with two directions) (±45°) are secured by the stitching yarn 130 in each of the reinforced substrates 146 of top and bottom outermost layers. Therefore, when the reinforced substrate 146 is elongated by application of a tensile load in a fixed direction, it is difficult to obtain uniform elongation due to the fact that the stitching yarn 130 is closely secured. Also, the auxiliary fibers 120 are formed as a mesh in the reinforced substrate 147 of the two middle layers. Consequently, when the reinforced substrate 147 is elongated by application of a tensile load in a fixed direction, it is difficult to obtain uniform elongation due to the fact that the auxiliary fibers 120 are secured to the reinforcing fibers 110 in a mesh form.

It was confirmed that a large load (reference symbol 161) is generated from an initial stage of shearing in the laminate 145 of the comparative example in which the reinforced substrates 146, 147 are laminated, as shown in FIG. 15. The shear load decreases with increased shear angle, i.e., with elongated reinforced substrates 146, 147. This indicates that there is breakage in the reinforced substrates 146 and 147, and it is believed that there is also breakage in the auxiliary fibers 120 or the stitching yarn 130 that secured the reinforcing layer 115. Therefore, it is believed that when the laminate 145 of the comparative example is shaped, the reinforced substrate does not elongate at the initial stage of shaping, and a wrinkle 160 is generated, as shown in FIGS. 14A and 14B.

On the other hand, each of the reinforced substrates 100, 101, 102 in the embodiment has a reinforcing layer 115 and auxiliary fibers 120. A fiber direction of the reinforcing fibers 110 is aligned in a single direction in the reinforcing layer 115. The auxiliary fibers 120 are laminated on the reinforcing layer 115 so as to follow only one direction intersecting the fiber direction, and are joined to the reinforcing fibers 110 to hold the reinforcing layer 115. Furthermore, the auxiliary fibers 120 have a higher tensile elongation at break than do the reinforcing fibers 110. The reinforcing fibers 110 and the auxiliary fibers 120 are stitched and joined together by the stitching yarn 130. It is unnecessary to secure the laminations (reinforced substrates 100 and 102, or reinforced substrates 101 and 102) to each other by stitching.

It was possible to confirm that the laminate 140 of the embodiment in which the reinforced substrates 100, 101, 102 are laminated had elongated at a lower load than the laminate 145 of the comparative example, as shown in FIG. 15. It was also possible to confirm that since there were fewer restraint points produced by the stitching yarn 130, there was no incidence of breakage of the stitching yarn 130 or breakage of the auxiliary fibers 120 that had occurred in the initial stage in the laminate 145 of the comparative example. It was possible to obtain a wrinkle-free shaped article during the shaping of the laminate 140 of the embodiment, as shown in FIGS. 13A and 13B. Therefore, as contrasted with the laminate 145 of the comparative example, the laminate 140 of the embodiment can be shaped without wrinkling, even if the draw depth is increased.

As described above, the reinforced substrate 100 of the present embodiment has the reinforcing layer 115 and the auxiliary fibers 120. The fiber direction of the reinforcing fibers 110 is aligned in a single direction in the reinforcing layer 115. The auxiliary fibers 120 are laminated to the reinforcing layer 115 so as to follow only one direction intersecting the fiber direction, and that are joined to the reinforcing fibers 110 to hold the reinforcing layer 115. The auxiliary fibers 120 have a higher tensile elongation at break than do the reinforcing fibers 110.

The reinforced substrate 100 configured in this manner is a so-called unidirectional substrate in which the reinforcing fibers 110 are oriented in a single direction. Because the reinforcing layer 115 is held by the auxiliary fibers 120, variation in the reinforcing fibers 110 is minimized and the aligned state of the reinforcing fibers 110 can be maintained. Also, the auxiliary fibers 120 have a higher tensile elongation at break than do the reinforcing fibers 110 and are more difficult to break than the reinforcing fibers 110. The auxiliary fibers 120 can continue to hold the reinforcing layer 115 without breaking. Therefore, the number of directions in which the reinforcing fibers 110 are restrained in the reinforced substrate 100 decreases, allowing for increased elongation and improved shaping properties. As a result, wrinkling is minimized when the reinforced substrate 100 is shaped. A wrinkle-free shaped article can be obtained. Furthermore, because the reinforced substrate comprises an NCF substrate, the manufacturing cost can be brought lower than for a cloth substrate.

The auxiliary fibers 120 have a lower modulus of elasticity than do the reinforcing fibers 110. This allows the auxiliary fibers 120 to deform flexibly in association with the deformation occurring when the reinforced substrate 100 is shaped, and to hold the reinforcing layer 115 without breaking.

The embodiment also has the stitching yarn 130 for stitching and joining together the reinforcing fibers 110 and the auxiliary fibers 120. This further suppresses variation in the reinforcing fibers 110 and further maintains the aligned state of the reinforcing fibers 110. As a result, wrinkling can be further suppressed when the reinforced substrate 100 is shaped.

The fiber bundles of the large tows are aligned in an unopened state in the reinforcing layer 115, the large tow having a higher fiber count of the reinforcing fibers 110 than a regular tow. The ability to use large tows and removing the need to open the fibers increases productivity of the reinforced substrate and makes it possible to further reduce the manufacturing cost.

The basis weight per layer of the reinforcing layer 115 is 300 to 400 g/m$^2$. The manufacturing cost can thereby be reduced and dimensions that correspond to product design can be flexibly selected.

The composite material 10 of the present embodiment is a composite material 10 in which a resin is disposed in the reinforced substrate 100. The reinforced substrate 100 has the reinforcing layer 115 and the auxiliary fibers 120. The fiber direction of reinforcing fibers 110 is aligned in a single direction in the reinforcing layer 115. The auxiliary fibers 120 are laminated on the reinforcing layer 115 so as to follow only one direction intersecting the fiber direction, and are joined to the reinforcing fibers 110 to hold the reinforcing layer 115. The auxiliary fibers 120 have a higher tensile elongation at break than do the reinforcing fibers 110.

Because the shaping properties of the reinforced substrate 100 are improved in the composite material 10 configured in this manner, the degree of freedom in shape during the shaping of the reinforced substrate 100 is increased. As a result, the degree of freedom in the external shape of the composite material 10 is increased. Furthermore, reducing the manufacturing cost of the reinforced substrate 100 makes it possible to reduce the manufacturing cost of the composite material 10.

The auxiliary fibers 120 have a lower modulus of elasticity than do the reinforcing fibers 110. The reinforcing layer 115 can be held without breakage of the auxiliary fibers 120, as a result of which the shaping properties of the reinforced substrate 100 are further improved and the degree of freedom in the external shape of the composite material 10 is further increased.

The composite material further includes the stitching yarn 130 that stitches and joins together the reinforcing fibers 110 and the auxiliary fibers 120. Wrinkling during the shaping of the reinforced substrate 100 can be further suppressed, as a result of which the shaping properties of the reinforced substrate 100 are further improved and the degree of freedom in the external shape of the composite material 10 can be further increased.

The fiber bundles of the large tows are aligned in an unopened state in the reinforcing layer 115, the large tows having a higher fiber count of the reinforcing fibers 110 than does a regular tow. Reducing the manufacturing cost of the reinforced substrate 100 makes it possible to further reduce the manufacturing cost of the composite material 10.

The basis weight per layer of the reinforcing layer 115 is 300 to 400 g/m$^2$. The manufacturing cost of the reinforced substrate 100 can be reduced and dimensions corresponding to product design can be flexibly selected. As a result, it is possible to further reduce the manufacturing cost of the composite material 10 and to flexibly select dimensions that correspond to product design for the composite material 10.

In the method for manufacturing the reinforced substrate 100 of the present embodiment, the reinforcing fibers 110 are arranged so as to form a reinforcing layer 115 in which the fiber direction of the reinforcing fibers 110 is aligned in a single direction. The auxiliary fibers 120 have a higher tensile elongation at break than do the reinforcing fibers 110, and are laminated on the reinforcing layer 115 so as to follow only one direction intersecting the fiber direction. Also, the auxiliary fibers 120 are joined to the reinforcing fibers 110 to hold the reinforcing layer 115.

A reinforced substrate 100 having improved shaping properties can be manufactured by the method for manufacturing the reinforced substrate 100 configured in this manner. As a result, wrinkling is suppressed when the reinforced substrate 100 is shaped, and a wrinkle-free shaped article can be obtained. Furthermore, using an NCF substrate can bring the manufacturing cost below that of a cloth substrate.

The auxiliary fibers 120 have a lower modulus of elasticity than do the reinforcing fibers 110. This makes it possible to manufacture a reinforced substrate 100 capable of holding the reinforcing layer 115 without breakage of the auxiliary fibers 120.

The reinforcing fibers 110 and the auxiliary fibers 120 are stitched and joined together by the stitching yarn 130. This makes it possible to manufacture a reinforced substrate 100 in which wrinkling can be further suppressed when the reinforced substrate 100 is shaped.

The arrangement of the auxiliary fibers 120 and the positions at which the fibers are stitched by the stitching yarn 130 are controlled on the basis of the arrangement of the reinforcing fibers 110. It is thereby possible to reliably stitch the mutually intersecting reinforcing fibers 110 and auxiliary fibers 120 together by using the stitching yarn 130. As a result, the aligned state of the reinforcing fibers 110 can be further maintained.

Fiber bundles of the large tows, which have a higher fiber count of the reinforcing fibers 110 than a regular tow, are arranged in an unopened state to form the reinforcing layer 115. The ability to use large tows and removing the need to open the fibers increases productivity of the reinforced substrate and makes it possible to reduce the manufacturing cost.

The basis weight per layer of the reinforcing layer 115 is 300 to 400 g/m². This makes it possible to reduce the manufacturing cost and to flexibly select dimensions that correspond to product design.

The reinforced substrate for a composite material, the composite material, and the method for manufacturing a reinforced substrate for a composite material are described above by way of an embodiment, but the present invention is not limited only to the configuration described in the embodiment, and changes can be made as appropriate on the basis of the description in the claims.

For example, a mode was shown in which the reinforcing fibers 110 and the auxiliary fibers 120 are stitched and joined together by the stitching yarn 130, but the auxiliary fibers 120 can be joined to the reinforcing fibers 110 using any suitable technique as long as the function in which the auxiliary fibers 120 hold the reinforcing layer 115 can be demonstrated. For example, the auxiliary fibers 120 can be joined to the reinforcing fibers 110 by an adhesive. When a joining method other than stitching is used, the reinforced substrate for a composite material and the composite material are not limited to a configuration provided with stitching yarn.

The method for molding the composite material is not limited to the RTM method. For example, autoclave molding or another known molding method can be selected as appropriate.

The invention claimed is:

1. A reinforced substrate for use in molding a composite material, the reinforced substrate comprising:
   a reinforcing layer having reinforcing fibers extending in a fiber direction that is aligned in a single direction; and
   auxiliary fibers laminated on only one surface of the reinforcing layer so as to extend in only one direction that intersects with the fiber direction, and joined to the reinforcing fibers to hold the reinforcing layer,
   the auxiliary fibers having a higher tensile elongation at break than the reinforcing fibers,
   the reinforcing layer being arranged with fiber bundles of the reinforcing fibers having large tows being aligned in an unopened state, the large tows each having a fiber count of 40,000 or more,
   the auxiliary fibers being arranged in a direction orthogonal to the fiber direction,
   a thickness of the auxiliary fibers being less than a thickness of the fiber bundles of the reinforcing fibers, and
   an interval between the auxiliary fibers being greater than a width of the fiber bundles of the reinforcing fibers.

2. The reinforced substrate according to claim 1, wherein the auxiliary fibers have a lower modulus of elasticity than the reinforcing fibers.

3. The reinforced substrate according to claim 1, further comprising
   a stitching yarn that stitches and joins the reinforcing fibers and the auxiliary fibers.

4. The reinforced substrate according to claim 1, wherein a basis weight per layer of the reinforcing layer is 300 to 400 g/m².

5. A composite material comprising:
   a reinforced substrate and a resin disposed in the reinforced substrate,
   the reinforced substrate comprising
   a reinforcing layer having reinforcing fibers extending in a fiber direction that is aligned in a single direction; and
   auxiliary fibers laminated on only one surface of the reinforcing layer so as to extend in only one direction that intersects with the fiber direction, and joined to the reinforcing fibers to hold the reinforcing layer,
   the auxiliary fibers having a higher tensile elongation at break than the reinforcing fibers,
   the reinforcing layer being arranged with fiber bundles of the reinforcing fibers having large tows being aligned in an unopened state, the large tows each having a fiber count of 40,000 or more,
   the auxiliary fibers being arranged in a direction orthogonal to the fiber direction,
   a thickness of the auxiliary fibers being less than a thickness of the fiber bundles of the reinforcing fibers, and
   an interval between the auxiliary fibers being greater than a width of the fiber bundles of the reinforcing fibers.

6. The composite material according to claim 5, wherein the interval between the auxiliary fibers is 3 to 6 times as great as the width of the fiber bundles of the reinforcing fibers.

7. The composite material according to claim 5, wherein the auxiliary fibers have a lower modulus of elasticity than the reinforcing fibers.

8. The composite material according to claim 5, further comprising
a stitching yarn that stitches and joins the reinforcing fibers and the auxiliary fibers.

9. The composite material according to claim 5, wherein
a basis weight per layer of the reinforcing layer in the reinforced substrate is 300 to 400 g/m² before the resin is disposed therein.

10. The reinforced substrate according to claim 1, wherein the interval between the auxiliary fibers is 3 to 6 times as great as the width of the fiber bundles of the reinforcing fibers.

* * * * *